United States Patent
Ki et al.

(10) Patent No.: US 9,584,723 B2
(45) Date of Patent: Feb. 28, 2017

(54) APPARATUS AND METHOD FOR CREATING PANORAMA

(71) Applicant: Electronics and Telecommunications Research Institute, Daejeon (KR)

(72) Inventors: Myung Seok Ki, Daejeon (KR); Ji Sung Yoo, Daejeon (KR); Seong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 14/156,950

(22) Filed: Jan. 16, 2014

(65) Prior Publication Data

US 2014/0240452 A1    Aug. 28, 2014

(30) Foreign Application Priority Data

Feb. 27, 2013    (KR) .................. 10-2013-0021237

(51) Int. Cl.
*H04N 7/00* (2011.01)
*H04N 5/232* (2006.01)

(52) U.S. Cl.
CPC ................. *H04N 5/23238* (2013.01)

(58) Field of Classification Search
CPC ................................................ H04N 5/23238
USPC ........................................................... 348/38
See application file for complete search history.

(56) References Cited

U.S. PATENT DOCUMENTS

2008/0253685 A1* 10/2008 Kuranov ............... G06T 3/4038
                                                                 382/284
2011/0043604 A1*  2/2011 Peleg .................... G06T 3/4038
                                                                  348/36

FOREIGN PATENT DOCUMENTS

CN           101136022 A    *  3/2008
CN           101146231 A1   *  3/2008
KR       1020110082736 A        7/2011

* cited by examiner

*Primary Examiner* — Jamie Atala
*Assistant Examiner* — Masum Billah
(74) *Attorney, Agent, or Firm* — William Park & Associates Ltd.

(57) ABSTRACT

An apparatus for creating a panorama is provided, the apparatus including an image obtainer to obtain at least two images via at least two cameras, an overlapping area analyzer to analyze an overlapping area among the at least two cameras, and extract overlapping image information, an image segmentation unit to segment the at least two images in an object unit, and generate image segmentation information, a depth value extractor to extract a depth value of an object in the at least two images, an image focus setter to set a focus value based on the depth value for the plurality of segmented objects, and a panorama creator to create panorama content of which a focus is convertible using the image segmentation information and the focus value.

20 Claims, 7 Drawing Sheets

APPARATUS AND METHOD FOR CREATING PANORAMA

CROSS-REFERENCE TO RELATED APPLICATION

This application claims the priority benefit of Korean Patent Application No. 10-2013-0021237, filed on Feb. 27, 2013, in the Korean Intellectual Property Office, the disclosure of which is incorporated herein by reference.

BACKGROUND

1. Field of the Invention

The present invention relates to an apparatus and method for creating a realistic sense of panorama content using a focus conversion effect of a panorama image.

2. Description of the Related Art

A panorama image capturing an image through a special optical lens/mirror or a plurality of cameras, and synthesizing the image may provide a viewing angle wider than general image media.

Although a general panorama image may be capable of providing a viewing angle wider than a conventional image, due to an absence of depth information, user navigation available within the panorama image may be merely a simple function of performing a digital zoom in/out and a viewpoint movement.

To overcome such restrictions, recent research is being conducted on various technologies providing a realistic sense of a panorama, such as, stereoscopic panorama, free-viewpoint panorama technology enabling a realistic sensation through creating an image based on a variable viewpoint of a user via image modeling, and the like, in a field of a panorama imaging.

However, use the technologies providing a realistic sense of a panorama is not widespread among real services due to difficulties and intricacies involved with creating and playing panorama content.

SUMMARY

According to an aspect of the present invention, there is provided an apparatus for creating a panorama, the apparatus including an image obtainer to obtain at least two images via at least two cameras, an overlapping area analyzer to analyze an overlapping area among the at least two cameras, and extract overlapping image information, an image segmentation unit to segment the at least two images into an object unit, and generate image segmentation information, a depth value extractor to extract a depth value of an object in the at least two images, an image focus setter to set a focus value based on the depth value for the plurality of segmented objects, and a panorama creator to create panorama content of which a focus is convertible using the overlapping image information, the image segmentation information, and the focus value.

The image obtainer may dispose the at least two cameras, of which angles of view are adjacent to one another, to overlap one another, and obtain a synchronized image.

The overlapping area analyzer may estimate the overlapping area of which a viewing direction is identical to a viewing direction of an adjacent image in each of the at least two images, and analyze homography information of the at least two images using the overlapping area.

The depth value extractor may analyze the homography information, time difference information among the at least two images, and object information in the overlapping area, and extract a relative depth value in the at least two images.

The image focus setter may allocate the focus value through increasing the focus value as a distance of the plurality of segmented objects increases based on the depth value of the plurality of segmented objects.

The panorama creator may create the panorama content of which a focus is convertible for the plurality of segmented objects, based on user navigation.

According to another aspect of the present invention, there is provided an apparatus for playing a panorama, the apparatus including a content interpreter to analyze panorama content input, and interpret play information and realistic sense information, a content player to play the panorama content using the play information and the realistic sense information, and an image object viewpoint converter to convert a focus value of an image object of the panorama content based on user navigation.

The content player may interpret a content navigation event, and change a viewpoint of the panorama content when the content navigation event is input.

The image object focus converter may reference the user navigation, and calculate a virtual location of the user and a depth value of the image object.

The image object focus converter may transform the panorama content through image processing to apply a visual difference based on the focus value.

According to still another aspect of the present invention, there is provided a method for creating a panorama, the method including obtaining at least two images via at least two cameras, analyzing an overlapping area among the at least two cameras, and extracting overlapping image information, generating image segmentation information through segmenting the at least two images in an object unit, extracting a depth value in an object of the at least two images, setting a focus value based on the depth value for the plurality of segmented objects, and creating panorama content of which a focus is convertible, using the overlapping image information, the image segmentation information, and the focus value.

According to yet another aspect of the present invention, there is provided a method for playing a panorama, the method including analyzing panorama content input, and interpreting play information and realistic sense information, playing the panorama content using the play information and the realistic sense information, and converting a focus value of an image object of the panorama content based on user navigation.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
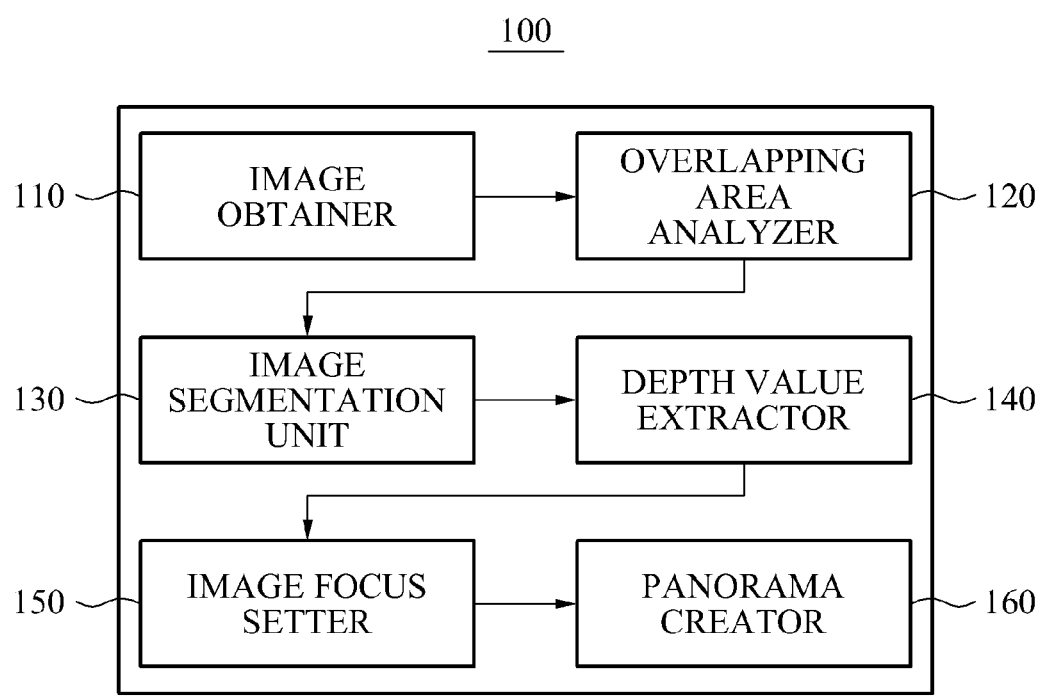
FIG. 1 is a block diagram illustrating a configuration of an apparatus for creating a panorama according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined that a detailed description related to a related known function or configuration which may make the purpose of the present invention unnecessarily ambiguous in the description of the present invention, such detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

An aspect of the present invention provides an apparatus and method for creating a realistic sense of a panorama image that obtains images obtained by capturing a plurality of angles of view using a plurality of cameras, analyzes the images to segment into objects/areas, estimates relative depth information among the objects/areas using overlapping camera information, and creating a realistic sense of a panorama image in which a focus of the objects/areas is convertible based on depth information in response to user navigation using the extracted objects/areas segmentation information and the relative depth information.

Realistic sense panoramas may obtain images using special hardware, or detailed depth information extracted from multiple images for representation of a realistic sense. According to an aspect of the present invention, it is possible to provide a user with a realistic sense of a panorama effect through combining objects/areas segmentation information within the obtained images and depth information extracted from overlapping area information among adjacent cameras, without assistance of special hardware for obtaining complex images or detailed three-dimensional (3D) modeling.

FIG. 1 is a block diagram illustrating a configuration of an apparatus 100 for creating a panorama according to an embodiment of the present invention.

Referring to FIG. 1, the apparatus 100 for creating the panorama may include an image obtainer 110, an overlapping area analyzer 120, an image segmentation unit 130, a depth value extractor 140, an image focus setter 150, and a panorama creator 160.

The image obtainer 110 may obtain at least two images via at least two cameras, and the overlapping area analyzer 120 may analyze an overlapping area among the at least two cameras, and extract overlapping image information.

The image segmentation unit 130 may segment the at least two images into an object unit, and generate image segmentation information, and the depth value extractor 140 may extract a depth value of an object in the at least two images.

The image focus setter 150 may set a focus value based on the depth value for the plurality of segmented objects, and the panorama creator 160 may create panorama content of which a focus is convertible using the overlapping image information, the image segmentation information, and the focus value.

The image obtainer 110 may dispose the at least two cameras, of which angles of view are adjacent to one another, to overlap one another, and obtain a synchronized image.

Figure 2:
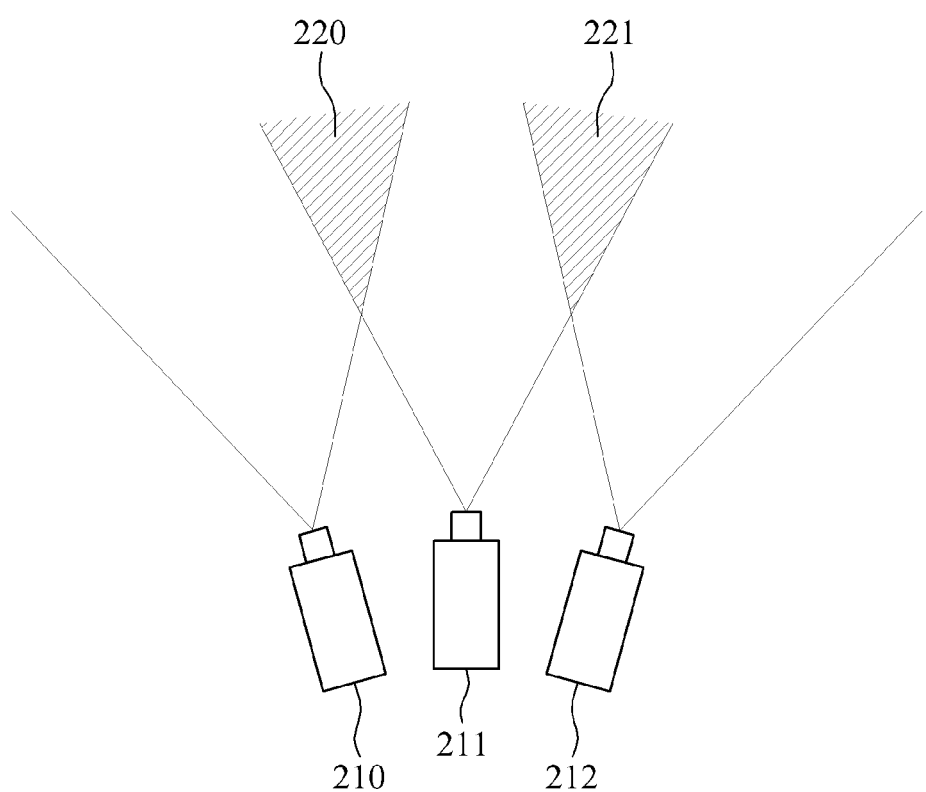
FIG. 2 is a diagram illustrating an example of a camera disposition for creating a realistic sense of a panorama image.

FIG. 2 is a diagram illustrating an example of a camera disposition for creating a real sensation panorama image.

Referring to FIGS. 1 and 2, the image obtainer 110 may dispose a multi camera and a camera of which angles of view are adjacent to one another, to overlap, and obtain a synchronized image. As shown in FIG. 2, the wider overlapping areas 220 and 221 among adjacent images obtained from cameras 210, 211, and 212, the greater amount of valid depth information extracted by the image obtainer 110. Also, obtaining an image in a broad focus so as to direct a focus to all objects in an image, while capturing the image, may be more conducive to creating a realistic sense of the panorama.

The overlapping area analyzer 120 may estimate an overlapping area of which a viewing direction is identical to a viewing direction of an adjacent image in a plurality of images, and analyze homography information of the plurality of images using the overlapping area.

The image segmentation unit 130 may analyze a captured image, and segment the image into an object or area unit. Here, image segmentation may be possible through image processing segmentation or direction image segmentation based on a user selection.

The depth value extractor 140 may analyze homography information, time difference information among at least two images, and object information in the overlapping area, and extract a relative depth value in the at least two images.

The depth value extractor 140 may analyze the homography information, the time difference information, and the object information in the overlapping area obtained via the overlapping area analyzer 120, and extract the relative depth value of the at least two images.

For example, a scheme for extracting a depth value may include a scheme for stereo matching between cameras or a scheme using geometric information among multi images, in particular, the greater an amount of overlapping information among images, the more precise an extracted depth value.

According to an aspect of the present invention, the image segmentation information analyzed in the preceding may be employed in an area in which overlapping image information is absent. A depth value may be estimated through increasing depth value information of the overlapping area and allocating an identical depth value to objects belonging to an identical group.

Figure 3:
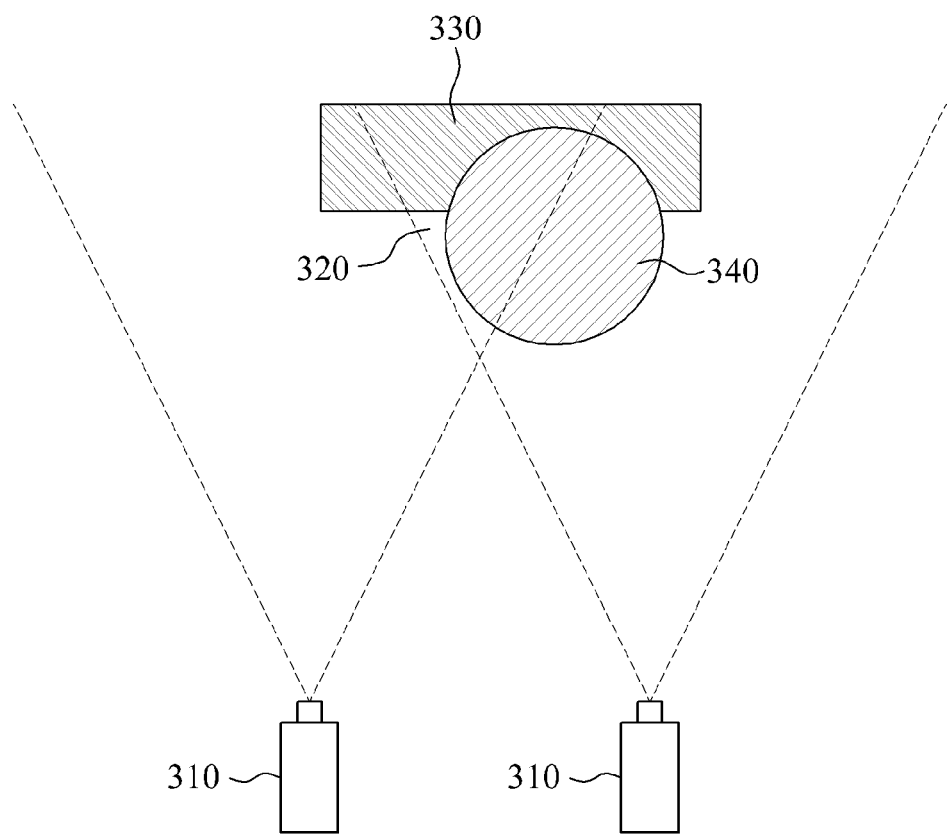
FIG. 3 is a diagram illustrating an example of estimating a depth value through expanding image segmentation information.

FIG. 3 is a diagram illustrating an example of estimating a depth value through expanding image segmentation information.

Referring to FIGS. 1 and 3, when objects such as a picture are assumed to exist in an image captured via two cameras 310, the image segmentation unit 130 may segment a square object 330 and a circle object 340 through image analysis.

The depth value extractor 140 may extract a depth value based on overlapping information of the two cameras 310. As shown in FIG. 3, although an instance in which the depth value may not be extracted because a portion of the square object 330 or a portion of the circle object 340 may exist outside an overlapping area 320, the depth value extractor 140 may allocate a depth value with respect to an area outside the overlapping area through expanding segmentation information belonging to an identical group present in the overlapping area.

The image focus setter 150 may allocate a focus value through increasing the focus value as a distance of a plurality of objects increases, corresponding to a depth value of the plurality of objects.

The image focus setter 150 may transform an image through image processing, such that objects may have differing definitions based on a distance using a blur effect, for example, a Gaussian filter, or store information for image transformation, based on an allocated focus value.

The panorama creator 160 may create panorama content of which a focus is convertible for a plurality of objects based on user navigation.

The panorama creator 160 may create a realistic sense of panorama content of which a focus is convertible for a plurality of objects based on navigation, for example, user zooming in/out, using overlapping image information, image segmentation information, focus information, and the like.

Figure 4:
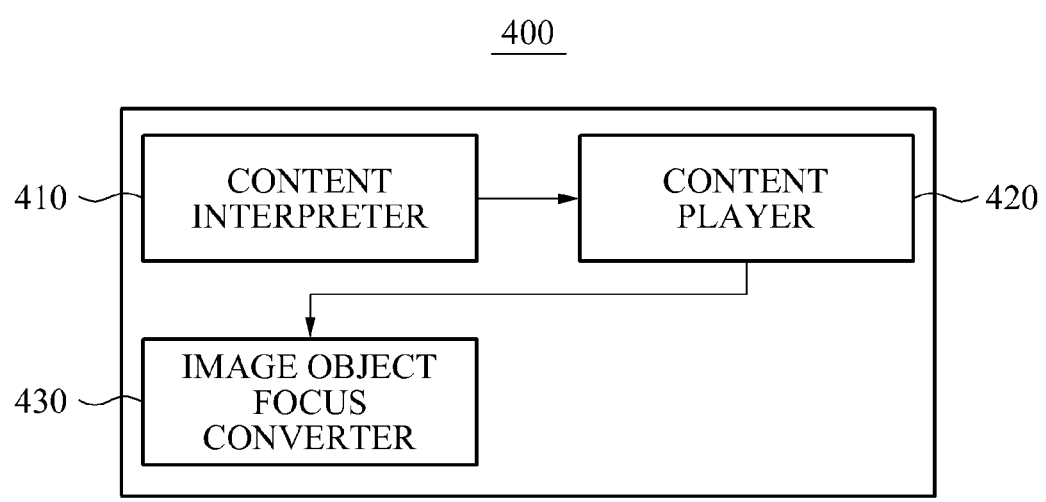
FIG. 4 is a block diagram illustrating a configuration of an apparatus for playing an image according to an embodiment of the present invention.

FIG. 4 is a block diagram illustrating an example of a configuration of an apparatus 400 for playing an image according to an embodiment of the present invention.

Referring to FIG. 4, the apparatus 400 for playing a panorama may include a content interpreter 410, a content player 420, and an image object focus converter 430.

The content interpreter 410 may analyze panorama content input to interpret play information and realistic sense information, and the content player 420 may play the panorama content based on the play information and the realistic sense information.

The image object focus converter 430 may convert a focus value of an image object of the panorama content based on user navigation.

The content player 410 may interpret a content navigation event and change a viewpoint of the panorama content when the content navigation event is input.

The image object focus converter 430 may reference the user navigation, and calculate a virtual location of a user and a depth value of the image object. The image object focus converter 430 may transform panorama content through image processing to apply a visual difference based on a focus value.

The image object focus converter 430 may calculate the virtual location of the user and the depth value of the image object based on a zooming-in/out factor when a zooming-in/out viewpoint of the user moves, combine focus values allocated to the image object when zoom parameter and a realistic sense of panorama contents is created, and set an image focus value re-calculated for panorama image objects.

Also, the image object focus converter 430 may transform an image through image processing, for example, an image blur effect or an image sharp effect for purpose of a visual effect based on the focus value.

Figure 5:
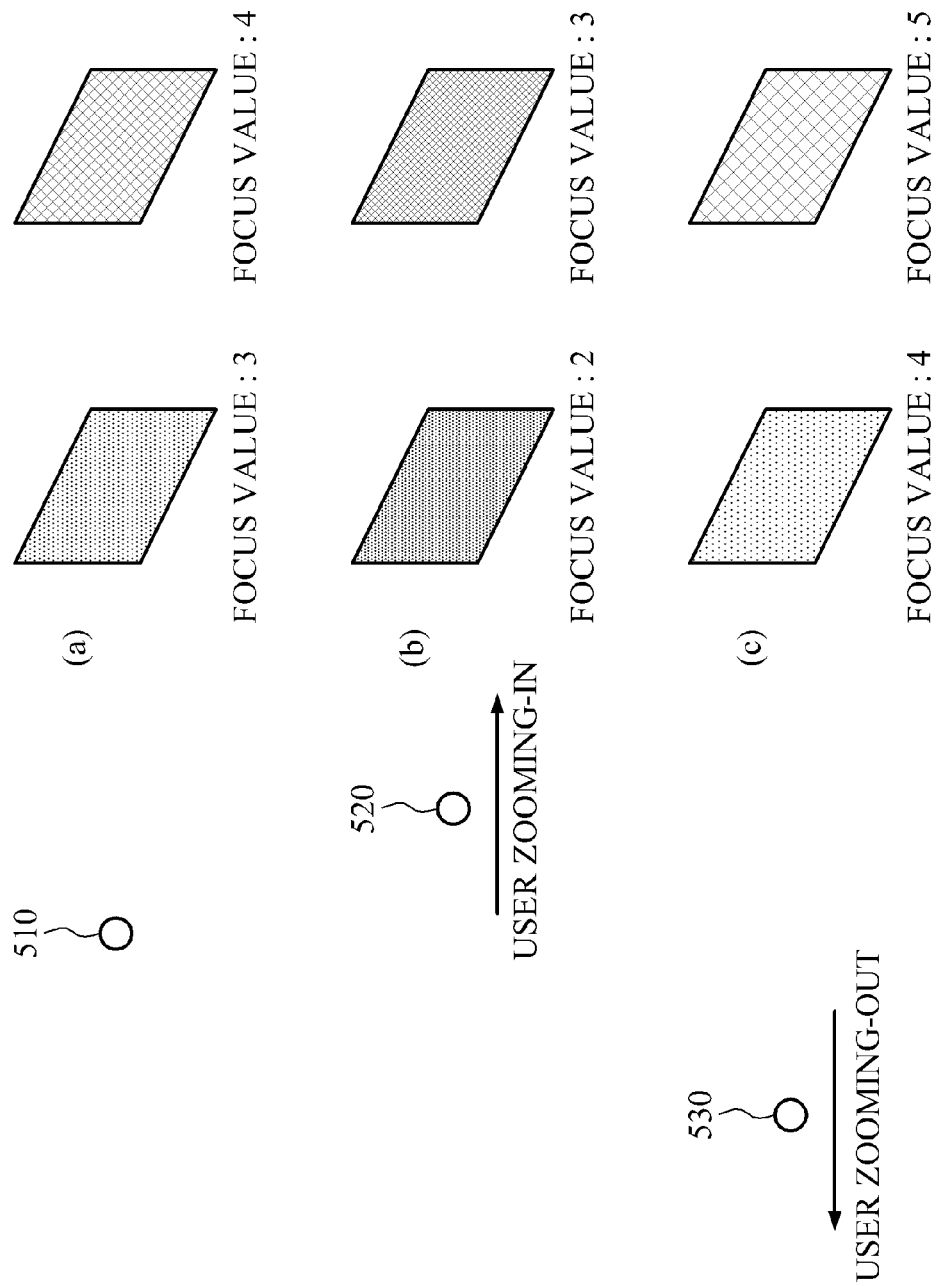
FIG. 5 is a diagram illustrating an example of a method for playing a focus conversion.

FIG. 5 is a diagram illustrating an example of a method for playing a focus conversion.

Referring to FIGS. 4 and 5, the image object focus converter 430 may allocate focus values of 3 and 4 to a plurality of image objects having respective depth values when realistic sense content is initially created as shown in (a) of FIG. 5. Consequently, when a zooming-in operation is performed during play, a virtual viewpoint of a user may approach the plurality of image objects as shown in (b) of FIG. 5.

In this instance, the image object focus converter 430 may change a focus in real time according to a movement of the user and expand an image, based on image clarification or image information stored, thereby creating an effect of a realistic sense for the user to experience a sense of an actual object approaching.

Also, a virtual viewpoint may grow more distant as a user zooms-out, as shown in (c) of FIG. 5, and as a result, the image object focus converter 430 may re-allocate a focus value correspondingly, and create an effect for the user to experience a sense of the actual object becoming distant.

Figure 6:
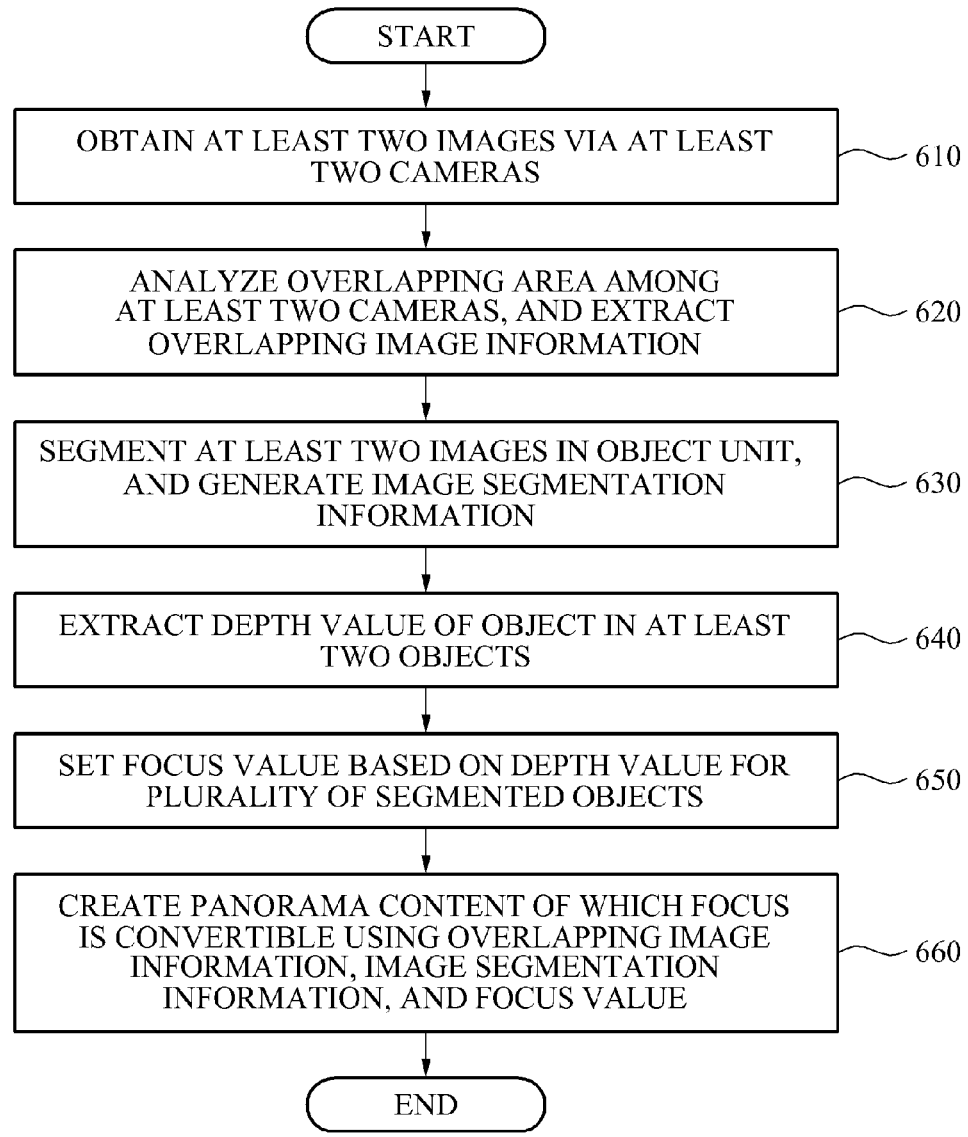
FIG. 6 is a flowchart illustrating a method for creating a panorama according to an embodiment of the present invention.

FIG. 6 is a flowchart illustrating a method for creating a panorama according to an embodiment of the present invention.

Referring to FIG. 6, an apparatus for creating a panorama may obtain at least two images via at least two cameras in operation 610, and extract overlapping image information through analyzing an overlapping area among the at least two cameras in operation 620.

The apparatus for creating the panorama may segment the at least two images in an object unit to generate image segmentation information in operation 630, and extract a depth value of an object in the at least two images in operation 640.

The apparatus for creating the panorama may set a focus value based on the depth value for the plurality of segmented objects in operation 650, and create panorama content of which a focus is convertible using the image segmentation information and the focus value in operation 660.

Figure 7:
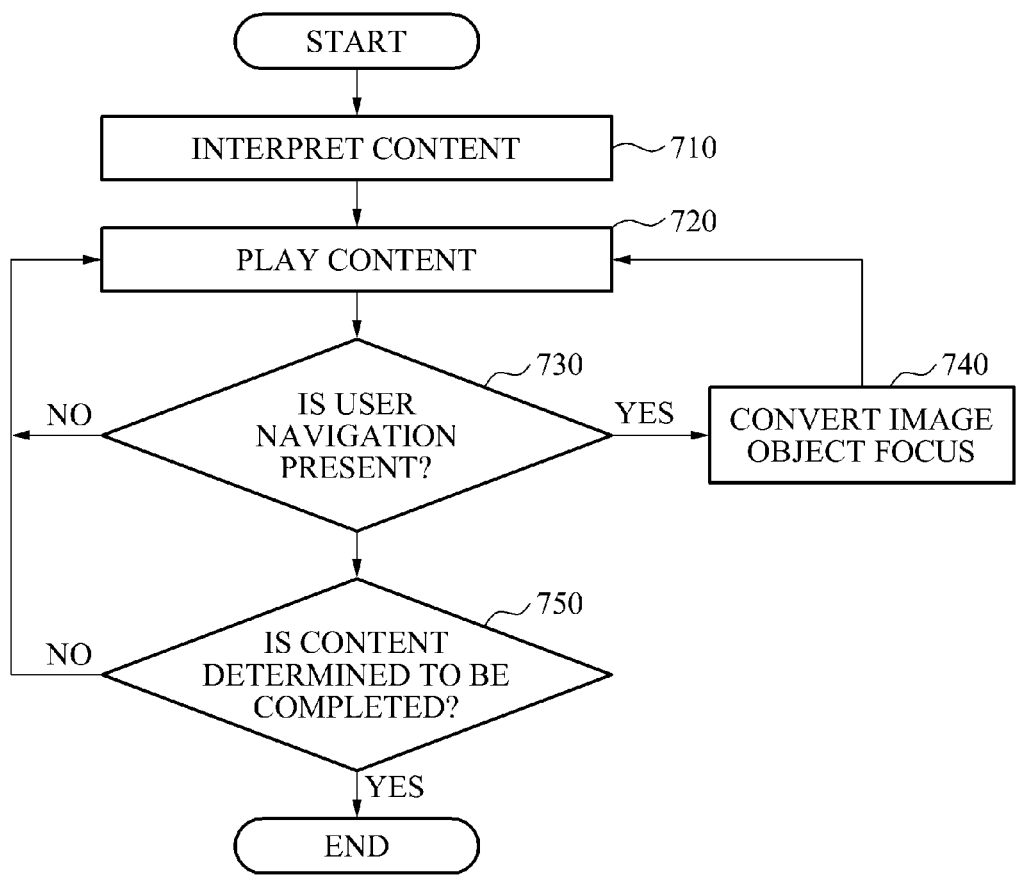
FIG. 7 is a flowchart illustrating a method for playing a panorama according to an embodiment of the present invention.

FIG. 7 is a flowchart illustrating a method for playing a panorama according to an embodiment of the present invention.

Referring to FIG. 7, in operation 710, an apparatus for playing a panorama may analyze panorama content input, and interpret play information and realistic sense information. In operation 720, the apparatus for playing the panorama may play the panorama content, based on the play information, and the realistic sense information.

The apparatus for playing the panorama may determine a presence of user navigation in operation 730, and when the user navigation is determined to be present, convert a focus value of an image object of the panorama content based on the user navigation in operation 740. In operation 750, the apparatus for playing the panorama may determine whether the panorama content is to be completed in an absence of the user navigation, and based on a result of the determination, complete the panorama content.

According an aspect of the present invention, a sense of a realistic effect in which a user may experience a sense of viewing 3D content through generating and combining overlapping camera information, area segmentation information, depth information, and the like, when a panorama image is captured.

According an embodiment of the present invention, area information and depth information may be extracted using overlapping image information from images obtained by capturing a broad angle of view via a plurality of cameras, a focus value based on the depth information may be set in an object unit, and an effect of a realistic sense may be provided to a user through automatically adjusting a focus based on depth of a plurality of objects using corresponding data during navigation operation, such as user zooming-in/out of a panorama image.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for creating a panorama, the apparatus comprising:
   an image obtainer to obtain at least two images via at least two cameras;
   an overlapping area analyzer to analyze an overlapping area among the at least two cameras, and extract overlapping image information;
   an image segmentation unit to segment the at least two images into an object unit, and generate image segmentation information;
   a depth value extractor to extract a depth value of an object in the at least two images;
   an image focus setter to set a focus value based on the depth value for the plurality of segmented objects; and
   a panorama creator to create panorama content of which a focus is convertible using the overlapping image information, the image segmentation information, and the focus value,
   wherein the focus is convertible for a plurality of objects based on a user zooming in or zooming out, and
   wherein a virtual location of the user is calculated based on a zooming-in/out factor when a zooming-in/out viewpoint of the user moves.

2. The apparatus of claim 1, wherein the image obtainer disposes the at least two cameras, of which angles of view are adjacent to one another, to overlap one another, and obtains a synchronized image.

3. The apparatus of claim 1, wherein the overlapping area analyzer estimates the overlapping area of which a viewing direction is identical to a viewing direction of an adjacent image in each of the at least two images, and analyzes homography information of the at least two images using the overlapping area.

4. The apparatus of claim 3, wherein the depth value extractor analyzes the homography information, time difference information among the at least two images, and object information in the overlapping area, and extracts a relative depth value in the at least two images.

5. The apparatus of claim 1, wherein the image focus setter allocates the focus value through increasing the focus value as a distance of the plurality of segmented objects increases based on the depth value of the plurality of segmented objects.

6. The apparatus of claim 1, wherein the panorama creator creates the panorama content of which a focus is convertible for the plurality of segmented objects, based on navigation of the user.

7. An apparatus for playing a panorama, the apparatus comprising:
   a content interpreter to analyze panorama content input, and interpret play information and realistic sense information;
   a content player to play the panorama content using the play information and the realistic sense information; and
   an image object viewpoint converter to convert a focus value of an image object of the panorama content based on navigation of a user,
   wherein the image object viewpoint converter calculates a virtual location of the user according to a zooming in/out viewpoint of the user.

8. The apparatus of claim 7, wherein the content player interprets a content navigation event, and changes a viewpoint of the panorama content when the content navigation event is input.

9. The apparatus of claim 7, wherein the image object focus converter references the navigation of the user, and calculates the virtual location of the user and a depth value of the image object.

10. The apparatus of claim 9, wherein the image object focus converter transforms the panorama content through image processing to apply a visual difference based on the focus value.

11. A method for creating a panorama, the method comprising:
    obtaining at least two images via at least two cameras;
    analyzing an overlapping area among the at least two cameras, and extract overlapping image information;
    generating image segmentation information through segmenting the at least two images in an object unit;
    extracting a depth value in an object of the at least two images;
    setting a focus value based on the depth value for the plurality of segmented objects; and
    creating panorama content of which a focus is convertible, using the overlapping image information, the image segmentation information, and the focus value,
    wherein the focus is convertible for a plurality of objects based on a user zooming in or zooming out, and
    wherein a virtual location of the user is calculated based on a zooming-in/out factor when a zooming-in/out viewpoint of the user moves.

12. The method of claim 11, wherein the obtaining of the at least two images comprises:
    disposing the at least two cameras of which angles of view are adjacent to one another, and obtaining the synchronized image.

13. The method of claim 11, wherein the extracting of the overlapping image information comprises:
    estimating the overlapping area of which a viewing direction is identical to a viewing direction of an adjacent image in each of the at least two images; and
    analyzing homography information among the at least two images using the overlapping area.

14. The method of claim 13, wherein the extracting of the depth value comprises:

analyzing the homography information, time difference information between the at least two images, and object information in the overlapping area, and extracting a relative depth value in the at least two images.

15. The method of claim 11, wherein the setting of the focus value comprises:

allocating the focus value through increasing the focus value as a distance of the plurality of segmented objects increases based on the depth value for the plurality of segmented objects.

16. The method of claim 11, wherein the creating of the panorama content creates the panorama content of which a focus is convertible for the plurality of segmented objects based on navigation of the user.

17. A method for playing a panorama, the method comprising:

analyzing panorama content input, and interpreting play information and realistic sense information;

playing the panorama content using the play information and the realistic sense information; and converting a focus value of an image object of the panorama content based on navigation of a user, wherein a virtual location of the user according to a zooming in/out viewpoint of the user is calculated.

18. The method of claim 17, wherein the playing of the panorama content comprises:

interpreting a content navigation event, and changing a viewpoint of the panorama content when the content navigation event is input.

19. The method of claim 17, wherein the converting the focus value of the image object comprises:

referencing the navigation of the user, and calculating the virtual location of the user and a depth value of the image object.

20. The method of claim 19, wherein the converting of the focus value of the image object further comprises:

transforming the panorama content through image processing to apply a visual difference based on the focus value.

* * * * *